July 17, 1956  W. L. MORRISON  2,754,660
APPARATUS FOR REFRIGERATING AIR
Filed May 12, 1955  2 Sheets-Sheet 1

Inventor
Willard L. Morrison
by Parker & Carter
Attorneys

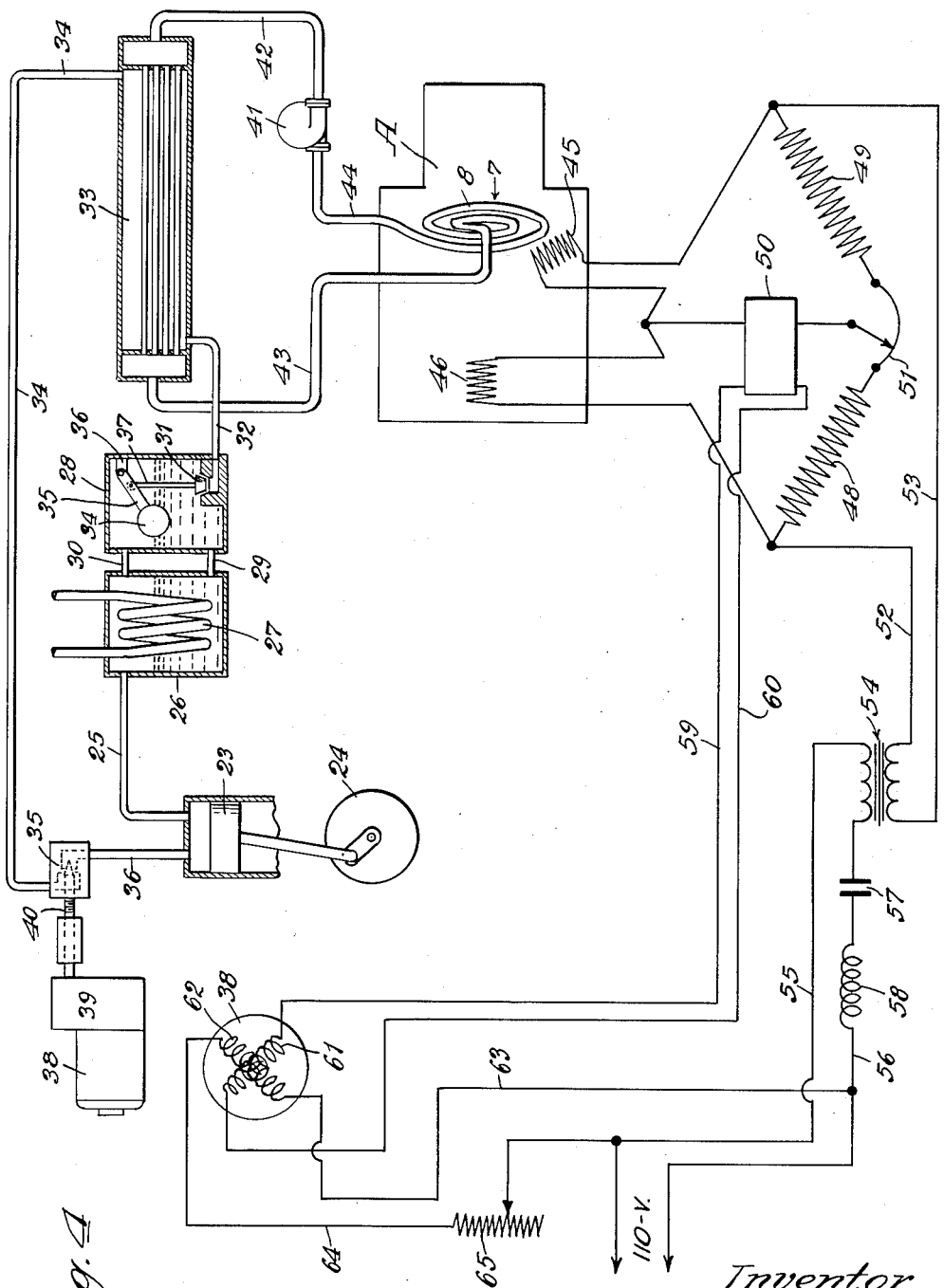

United States Patent Office 2,754,660
Patented July 17, 1956

2,754,660
APPARATUS FOR REFRIGERATING AIR

Willard L. Morrison, Lake Forest, Ill., assignor to The Union Stock Yard and Transit Company of Chicago, Chicago, Ill., a corporation of Illinois Application May 12, 1955, Serial No. 509,263

4 Claims. (Cl. 62—6)

This invention relates to improvements in refrigerating means and it has for one of its objects to provide an apparatus and method for refrigerating air and for controlling moisture content of the refrigerated air and it is a related object to provide air for refrigeration which is supersaturated with moisture in vapor form and in which the moisture vapor in the supersaturated air is present substantially in a metastable state.

Another object is to provide a controlling means in connection with a refrigeration device which will maintain a controlled and definite relationship between the temperature of a cold element such as a cooling coil employed for the extraction of heat from partially compressed air and the wet bulb temperature of the air entering the refrigerating machine before compression to maintain the coils at a temperature for extraction of heat from the air without cooling the air to below its dew point.

Another object of this invention is to supply air which has been refregerated to the neighborhood of the freezing point of water and which is supersaturated with moisture in vapor form.

In the past, use has been made of brine systems for the refrigeration of an enclosed space in which such perishable food products as freshly killed meat carcasses are arranged for cooling the meat carcasses down to a safe storage temperature. In a brine system of the type which has heretofore been employed, use has been made of banks of cooling coils through which the brine refrigerant is circulated for reducing the temperature of the air within the refrigerated space. Temperature distribution is achieved by flow of the air from the cooling coils downwardly through the room to cause displacement of the hot air to the upper regions thereof into contact with the cooling coils. Such refrigerating means has required considerable time to effect the desired extraction of heat from the food products housed within the refrigerated space and has therefore tied up the refrigerated space for extensive periods. During such refrigeration process in which the air is circulated slowly through the room by natural gravitation, moisture is extracted from the food products to the extent that excessive desiccation occurs and moisture loss up to about 2½ to 3 percent by weight is not uncommon during chilling of freshly killed meat to safe storage temperature.

I propose to provide means which will draw air from a closed chamber, compress the air without change in moisture content as by means of a suitable fan or compressor during which the temperature of the air is raised by heat of compression.

Thereafter I propose to cool the compressed air to a point slightly above its dew point so as to avoid condensation of moisture which would reduce the moisture content of the air from that originally withdrawn from the closed chamber. The cooling will be accomplished by passing the compressed air over the evaporator of a suitable refrigeration machine or over cooling coils through which refrigerants are circulated. The evaporator temperature will be maintained such that there will be substantially no deposit of moisture or formation of frost on the cooling coils, especially during normal operation of the machine.

Thereafter the cooled, compressed air stream will be expanded and caused to do work thereby further reducing its temperature. The air at about saturation before expansion will become supersaturated with moisture in vapor form and will then be returned at its cooled state back to the chamber, carrying with it its excess moisture in the form of vapor thereby to reduce the temperature in the chamber to a point desirable for extracting the heat rapidly from the meat products contained therein and the refrigerated air introduced into the chamber will provide an atmosphere supersaturated with moisture so as to avoid desiccation of the food products or the extraction of excessive amounts of moisture therefrom. Under these circumstances, vegetables, meat products and the like are cooled without evaporation of natural moisture therefrom and such cooling operation is rendered more efficient by reason of the fact that the cold and supersaturated air is circulated at relatively high velocity through the refrigerated space and past the food products to be refrigerated more rapidly to extract heat therefrom.

There are certain critical points in an operation of the type proposed. The apparatus should operate in a manner such that the air temperature is reduced with resultant decrease in the ability of the air to hold moisture while the moisture originally in the air is substantially maintained with the result that the air soon becomes supersaturated with moisture in vapor form for introduction into the refrigerated space sufficiently to maintain supersaturated conditions therein. For this purpose it is desirable to control the evaporator of the refrigeration machine or the cooling coil above a temperature at which moisture is caused to condense out of the air passing thereover. The same situation prevails in connection with the expansion turbine in which the cooled and compressed air is caused to expand and do work further to reduce its temperature whereby the moisture which remains in vapor form in the air is sufficient to supersaturate the air.

I propose an apparatus to accomplish this process which will consist in a prime mover, e. g. an electric motor for driving an axial flow compressor fan. Preferably guide means will be associated with the rotor, such as diffusion vanes, to direct the air along axial lines past and across the cooling coils or plates of the evaporator of a suitable refrigeration machine which defines a precooling zone. The refrigeration machine should be so adjusted, controlled and operated that the temperature of the evaporator will be such that under normal conditions of operation, no moisture will be deposited.

The air from the precooling zone, traveling at high velocity, will pass through an expansion turbine where the turbine nozzle vanes will preferably function to twist the air while the expansion turbine wheel will untwist the air, thus doing work as the air expands. The air thus cooled as a result of this work and this expansion will be returned directly to the cooling chamber.

During initial stages of the refrigeration cycle, when the meat or other food products are first loaded into the refrigerated space, the temperature within the refrigerated space may be substantially above that desired for refrigeration. In this event, the amount of heat extracted from the compressed air circulated through the refrigeration machine may be substantially hot but it is desirable to adjust the temperature of the cooling means for extraction of heat from the compressed air to a point where condensation of moisture will be at a minimum during this initial unsteady state in the refrigeration cycle.

When the temperature within the refrigerated space has been reduced substantially to the level desired, a steady state will develop wherein the air withdrawn from the refrigerated space into the refrigeration machine by the compression fans will be but a few degrees above the desired temperature and will be substantially saturated with moisture in vapor form. The cooling means such as the evaporator of the refrigeration machine can thus be adjusted for extraction of heat of compression from the air circulated from the compression fan without reducing the temperature of the air to below its dew point thereby to avoid condensation of moisture originally contained within the air. In the event that the temperature of the air discharged from the turbine decreases to below the point desired for introduction into the refrigerated space to the extent that condensation might occur, the temperature of the cooling coils is adjusted automatically for raising the temperature to a point at which no moisture will be deposited and less heat will be extracted so that the air discharged will be sufficiently above the desired temperature for introduction into the refrigerated space by an amount to permit the work done during expansion to bring the temperature down to the desired level. In any event, the temperature of the air issuing from the expansion turbine into the refrigerated space will be at a lower level than the temperature of air withdrawn from the refrigerated space into the refrigeration machine with the result that the amount of moisture originally contained in the air will be sufficient in vapor form to supersaturate the refrigerated air returned for positive circulation through the refrigerated space.

This application is a continuation-in-part of my application Ser. No. 190,547, filed October 17, 1950, for "Refrigerating Machinery."

My invention is illustrated more or less diagrammatically in the accompanying drawings wherein—

Figure 4 is a diagram showing the relationship of the control elements to the refrigerating machine.

Like parts are indicated by like characters throughout the specification and drawings.

Figure 1:
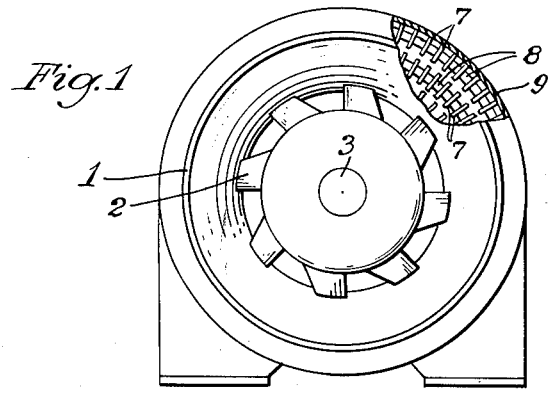
Figure 1 is an end view with a part of the evaporator coil housing cut away.

Referring to the drawings, I show an inlet funnel 1, through which air is drawn by an axial flow fan or blower 2, mounted on a motor shaft extension 3. The air passes through the diffusion vanes 4 to the chamber 5. The extension 3 is mounted on the shaft of a motor 6.

The air from chamber 5 is forced past and about the fins of the evaporator coil 7. Evaporator coil 7 consists of fin-like pieces mounted on spirally wound tubes 8 which contain the refrigerant or cooling medium. A cylindrical housing 9 surrounds the evaporator coils 7. The evaporator coil is so arranged that there is practically no pressure drop in the air as it passes through it. The air coming from the evaporator coils 7 is, so to speak, twisted by the turbine nozzle vanes 10 and then untwisted (work being done) by a reaction turbine 11 mounted on the second motor shaft extension 21 before being discharged through the turbine exhaust nozzle 12. The coil 8 is the evaporator of conventional refrigeration system which is disclosed diagrammatically in Figure 4.

The air entering the inlet funnel 1 may be the ambient air in an insulated food storage cabinet 75 in which the apparatus is located and the air may be assumed, for example, to be substantially saturated with moisture and at the temperature of approximately 34°. It is compressed by the axial flow fan to about 0.5 to 3.0 pounds per square inch and it is heated by compression to about 42° F. It is then sent through the cooling coils 7 which lower the temperature to about 34° F. which is equal to or slightly above the temperature of the air entering the refrigeration machine. This is above the freezing point of water and not below the temperature of the saturated air entering the compression fan with the result that the air will still be above its dew point and no water will be condensed out during the cooling stage. The air enters the turbine vanes at about 34° F. and after being twisted by these vanes and untwisted by the turbine expander, the temperature of the air, as a result of the work done, will drop to about 31.5° F. Thus the air is reduced to below that of the saturated air withdrawn from the chamber without loss of moisture and will thus exceed 100 percent relative humidity when introduced directly from the expansion turbine into the refrigerated space.

Referring now to the showing of Figure 4, 23 is a compressor. It is driven by a motor 24 and discharges a volatile refrigerant such as freon, through a pipe 25 to a water condenser 26, the condenser being cooled by water passing through the coils 27. The means for circulating water through the coils forms no part of the invention and are not illustrated. 28 is a float chamber communicating with the water cooled condenser through the pipes 29 and 30 respectively adjacent the upper and lower portions of the condenser chamber and float chamber.

31 is a float valve controlling discharge of volatile refrigerant through the pipe 32 to the evaporator 33. 34 is a float, on a lever arm 35 pivoted to the bracket 36 in the interior of the float chamber 28 and connected by the rod 37 to the valve 31. The suction line 34 leads from the evaporator 33 to the needle valve 35 and the suction line 36 extends from the needle valve to the compressor 23.

38 is a two phase 110 volt motor which through gearing 39 drives the needle valve 40 so that operation of the motor rotates the needle valve stem 40 to open and close the needle valve.

Figure 2:
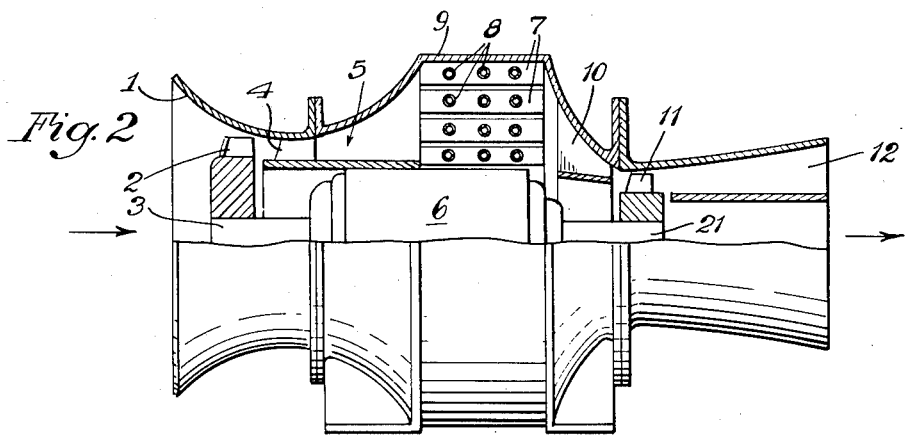
Figure 2 is a view through the length of the device, the lower half in elevation and the upper half in section.

A refrigerator such as illustrated in Figures 1 and 2 is shown diagrammatically at A in Figure 4. A pump 41 circulates a eutectic, for example, brine, through pipe 42, the evaporator 33, pipe 43, coil 7, pipe 44, back to the pump 41 so that the continued circulation of the eutectic through the pipe coil 8 in the refrigerating apparatus extracts heat from the air passing around the coil 7, 45 is an electric resistor coil so associated with the coil 7 that it will always be at the temperature thereof. 46 is an electric resistor coil in the path of the incoming air through the inlet funnel 1 so that the coil 46 will always be at the wet bulb temperature of the air entering the refrigerating machine.

The coils 45, 46, 47, 48, 49 are part of a conventional Wheatstone bridge circuit. Coils 48, 49 are wound of material which is relatively unaffected by variations in the temperature of the material or its environment. 50 is an amplifier and 51 a variable resistor. 52, 53 are conductors joining the two ends of the Wheatstone bridge with an alternating current transformer 54. 110 volt circuit comes to the transformer through the conductors 55, 56, there being a capacitor 57 and an inductance 58 in the circuit including the power source and the transformer.

For convenience, I have shown the two-phase motor 38 both in side elevation and diagrammatically to show the circuit. Conductors 59, 60 join the amplifier 50 in circuit with one winding 61 of the two-phase motor 38. The other winding 62 is in circuit by conductors 63, 64 and variable resistance or reactor 65 with the power source so that the winding 62 is constantly excited.

Figure 3:
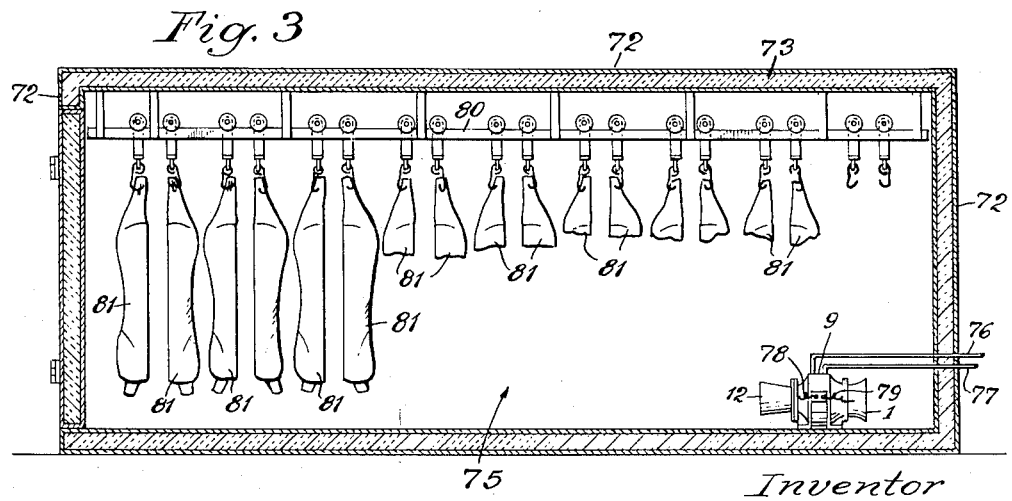
Figure 3 is a vertical section through a refrigerating chamber showing a preferred form of my refrigerating apparatus in position therein.

While my refrigerating apparatus may be used in any circumstances where it is desirable to get cold, supersaturated air, I have illustrated in Figure 3 one application of my apparatus. 75 is a cold chamber. It is enclosed by walls 72 insulated at 73. The turbo-refrigerating unit 9 is contained within that chamber. Ducts 76 and 77 passing out through the walls of the chamber communicate with a refrigerating apparatus to cool the coils 8. Wires 78, 79 provide power to operate the motor 6. 80 indicates tracks on the ceiling of the chamber on which meat 81 may be hung. It will be understood that the walls of the chamber are cooled only by the cold atmosphere in the chamber. The insulation is to limit heat flow into the chamber.

The use and operation of my invention are as follows:

The operation of this device depends upon the fact that when air is compressed, its temperature rises. Thereafter, some of the heat can be removed without reaching the dew point and such partially cooled compressed air can then expand doing work with resultant reduction in temperature and pressure. Under these circumstances the air can be saturated or even supersaturated without any deposit of moisture. After the air has been compressed by an axial flow fan and then cooled, if the air thereafter is allowed to expand down to atmosphere through an air turbine, it will do some work represented by the drop in pressure between the entrance to and discharge from the turbine and this work reduces the load on the electric motor which drives the fan. The temperature of the cooling coils and the action through the turbine is such that there is no substantial deposit of moisture on the surfaces past which the air passes, and the air discharged into the room is supersaturated with moisture in vapor form.

It is apparent that for satisfactory operation of the turbo refrigerating unit it is desirable that there be maintained a definite relationship between the temperature of the refrigerated coil which extracts heat from the compressed air and the dew point of the air passing thereover. In the construction shown in Figure 4, the cooling of the air in the turbo-refrigerator is accomplished by means of circulating a refrigerant such as brine through the cooling coils and using conventional methods for extracting the heat from the brine as by means of an evaporator. By circulating the brine through the cooling coil with greater rapidity, there will be no great change between the temperature of the brine as it enters and as it leaves the coil and therefore the variations of the temperature in the cooling coil will be held at a minimum.

In the form of construction proposed, the relation between the wet bulb temperature of the entering air and the coil will be realized by means of resistor units having a relatively high temperature coefficient with respect to change of temperature. Coils wound of practically any pure metal will be satisfactory as all pure metals have nearly the same temperature coefficient of resistivity. I have selected coils wound of enameled copper wire because it is easy to obtain such material with a relatively high degree of uniformity and purity. Resistor coil 46 is responsive to the wet bulb temperature of the entering air because it is in intimate thermo relation with a cloth which is kept wet by means of pure water. Resistor coil 45 is in thermo relation with refrigerator coil 7 in the turbo-refrigerator. Resistor coils 45 and 46 form part of a conventional Wheatstone bridge circuit, and their resistance varies in consonance with change in temperature. The other two resistor coils 48 and 49 are wound of material which is relatively unaffected by variations in temperature.

In the typical Wheatstone bridge circuit the current which must necessarily flow through the bridge in order to provide means for determining the state of balance, enters and leaves at points connected with the alternate connections on the Wheatstone bridge circuit from the connection to the amplifier which replaces the galvanometer, which otherwise would indicate whether or not the bridge is in a state of balance. In my construction, alternating current will be supplied to the Wheatstone bridge circuit and will be supplied by the transformer 54. The amplifier 50 is connected at one of its terminals to the connection between coils 46 and 45 and at its other terminal to a variable resistor 51; this permits fixing the temperature ratio between resistor coils 45 and 46, if, as may well be the case, the relation should be other than equality. The brine is circulated through the refrigerating coil 7. The refrigerant, e. g., Freon, enters the shell or evaporator 33 to surround the tubes through which the brine circulates, being controlled by the float valve 31 which maintains a relatively constant level of refrigerant within the evaporator 33. Although it is a high side float and its primary function is to maintain a constant level in the evaporator 33, it does so by maintaining a fixed level of liquid within the water cooled condenser 27. The evaporation of the refrigerant in evaporator 33 cools the brine and at the same time produces refrigerating vapor which passes out of evaporator 33 into the suction line 34. From there it passes through a motor controlled needle valve 35 to the refrigerating compressor 24 back to the water cooled condenser 27.

The rate at which the refrigerant withdraws heat from the brine is directly related to the rate at which the compressor withdraws the vapor from the evaporator 33 through suction line 34. I propose to control this rate of refrigeration by manipulating the needle valve by means of the two-phase motor 38. The windings 61 and 62 are in the frame of the motor in what is known as phase quadrature where the magnetism produced by a fixed current passing through one of the windings is spaced ninety electrical degrees from the magnetism produced by a similar current passing through the other winding. Windings 62 are constantly excited by being connected to the 110 volt alternating current circuit, the amount of current flowing being controllable by means of variable resistor or reactor 65. Winding 61 is connected to the amplifier 50 which amplifies the relatively slight current that flows with a small unbalance from what are normally the galvanometer connections. The transformer 54 which supplies the energizing current for the Wheatstone bridge circuit is also connected to the same 110 volt circuit and the capacitor 57 and inductance 58 makes it possible to adjust the phase relation of the current from the amplifier passing through winding 61 with respect to the current flowing through the constantly excited winding 62.

If at any time the relation of resistances of coils 46 and 45 and coils 48 and 49 are in balance no current will flow into amplifier 50 and consequently no current will flow through coil 61 of motor 38 and there will be no motion of the armature. If, on the other hand, the temperature of coil 45 which is responsive to the temperature of refrigerant coil 7 is relatively high with respect to the temperature of the wet bulb coil 46 there will be an unbalance and a very small current will flow into amplifier 50, will be amplified and will excite winding 61 of the motor 38 with current of such phase relation that it will cause the motor to rotate in such a direction as to open the needle valve 35 and thereby permit a greater flow of vapor from evaporator 33 with consequent greater withdrawal of heat from the brine passing through coil 7, thus lowering its temperature until coil 45 is again in balance with coil 46. On the other hand, should coil 45 be colder than coil 46 the current coming from the amplifier will be supplied in phase from the previously described condition and the rotation of the motor will be such as to tend to close needle valve 35 and thereby reduce the rate of refrigeration.

Should experience demonstrate the undesirability of having coil 45 constantly in the same resistance relation with coil 46 and that this relation be made a function of the ambient temperature of the room in which the turbo-refrigerator is placed, this may be effected by substituting for fixed resistors 48 and 49 coils which have a temperature coefficient of the right relation and right value to produce the modification of the fixed relation between resistor coils 46 and 45 that is desired.

I claim:

1. Means for discharging cold, wet air at approximately 32° F. and with a moisture content of not less than 100 percent relative humidity including a housing containing an air passage, a blower adapted to compress ambient air and propel it along said passage, a cold element exposed to and adapted to cool the compressed air, a turbine in the path of said compressed air where the air is compelled to do work with resultant cooling, means for supplying power to the compressor, means for controlling the rate of heat extraction from the cooler in consonance with the differential between the wet bulb temperature of the air entering the compressor and the temperature of the cooler.

2. In combination, an air compressor, an air cooler and an air expander, means for actuating the compressor to compress and heat the air and force it through the cooler and the expander at a velocity high enough to maintain condensed moisture in suspension in the air, means for maintaining the surfaces exposed to the air in the cooler at a temperature below the air temperature and above the dew point and means for discharging the wet, cold air from the expander, means for controlling the temperature of the cooler surfaces exposed to the air in consonance with the differential between the wet bulb temperature of the air entering the compressor and the temperature of the cooling surfaces.

3. Means for discharging cold wet air at approximately 32° F. and with a moisture content of not less than 100 percent relative humidity comprising a housing containing an air passage, a blower adapted to compress ambient air and propel it along said passage while raising the temperature of the air by heat of compression, a cold element in alignment to receive the compressed air from the blower for extraction of heat of compression therefrom and to reduce the air temperature, means for maintaining the temperature of the surfaces of the cooling element at a levl to prevent extraction of heat in amount sufficient to cool the compressed air below its dew point whereby the amount of moisture in the air delivered from the cold element corresponds to the amount of moisture in the compressed air entering the cold element, a turbine in alignment to receive the cooled and compressed air wherein the air expands while doing work with resultant cooling to a temperature below the temperature of the air entering the blower without loss in moisture thereby to deliver air having a lower temperature than the incoming air to the blower and therefore at a higher relative humidity, and means for supplying power to the compressor.

4. Means for delivering cold and supersaturated air to a refrigerated space comprising a housing having an inlet and an outlet portion, a blower in communication with the inlet for receiving air from the cooled space and compressing the air while raising the temperature of the air by heat of compression, a cooling means in communication with the blower for receiving the compressed air from the blower and for extracting heat of compression therefrom to reduce the air temperature, means for maintaining the temperature of the surfaces of the cooling means at a level to prevent extraction of heat from the compressed air to cool the compressed air below the dew point whereby the amount of moisture in the air delivered from the cooling means corresponds to the amount of moisture in the compressed air entering the blower, a turbine in communication with the cooling means for receiving the cooled compressed air and wherein the cooled and compressed air expands while doing work with resultant further reduction in temperature to below the temperature of the air entering the blower without loss in moisture content whereby to deliver a supersaturated state cold air, and means for supplying power to the compressor, said refrigerated space being in direct communication with the outlet from the turbine for receiving the cold supersaturated air therefrom.

References Cited in the file of this patent

UNITED STATES PATENTS

| | | |
|---|---|---|
| 112,654 | Tripler | Mar. 14, 1871 |
| 184,012 | Kleinschmidt | Nov. 7, 1876 |
| 244,601 | Hill | July 19, 1881 |
| 2,046,314 | Benkly | July 7, 1936 |
| 2,073,833 | Bothezat | Mar. 16, 1937 |
| 2,181,898 | Kastler | Dec. 5, 1939 |